UNITED STATES PATENT OFFICE 2,289,373

HYDROGENATED SAPOGENIN TRANSFORMATION PRODUCT AND PREPARATION OF SAME

Russell Earl Marker, State College, Pa., assignor to Parke, Davis & Company, Detroit, Mich., a corporation of Michigan No Drawing. Application March 8, 1941,
Serial No. 382,450

12 Claims. (Cl. 260—397.1)

This invention relates to steroidal hormone intermediates and preparation of the same, and, more particularly, to the preparation of new steroidal sapogenin derivatives useful as intermediates for the manufacture of hormones.

This application is a continuation in part of my co-pending application, Serial No. 317,419, filed February 5, 1940. Some of the subject matter disclosed herein is claimed in my divisional application, Serial No. 417,738, filed November 3, 1941.

One of the objects of this invention is to prepare new steroidal sapogenin derivatives which can readily be converted to pregnane derivatives.

A further object of this invention is the preparation, from these new steroidal sapogenin derivatives, of pregnane derivatives readily convertible into hormones such as those having progestational and cortical activity.

Other objects will be apparent from a perusal of this specification.

The steroidal sapogenins have, in general, the formula $C_{27}H_{44}O_{3-5}$, of which the portion $C_8H_{16}O_2$ is known to be present as a side chain attached to ring D of the steroid skeleton. Tschesche and Hagedorn (Ber. 68, 2247 (1935)) proposed the formula

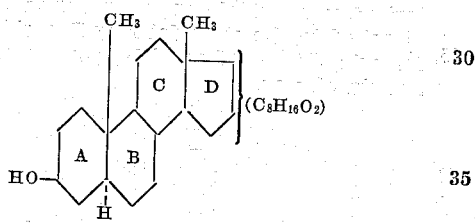

or

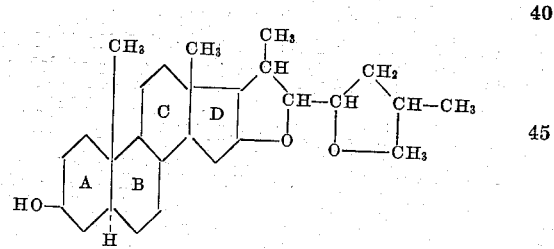

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have been shown to differ from tigogenin only in regard to the connections between ring A and B, the degree of saturation of the ring system, and the number of substituents attached to these rings.

These differences are shown below:

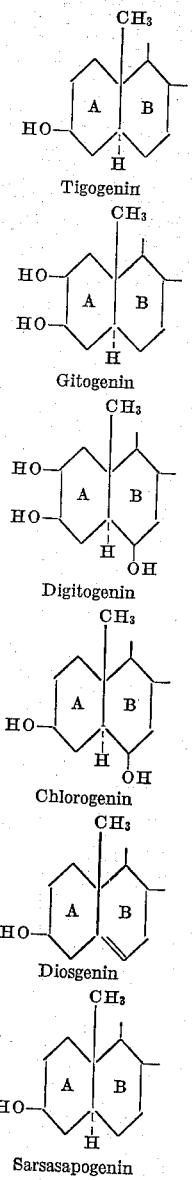

I have recently suggested (Marker & Rohrmann J. A. C. S. 61, 846 (1939)) that a more likely structure for the side chain of these steroidal sapogenins is that shown below.

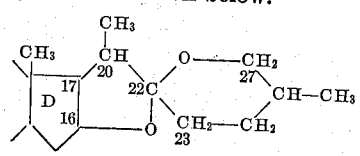

It is apparent that this formulation differs from that of Tschesche and Hagedorn in that the linkage, $C_{27}$—O—, is transferred from $C_{23}$ to $C_{22}$. However, a profound difference in the nature of the functional character of the side chain oxygen atoms is implied, for while the Tschesche-Hagedorn formula is that of an $\alpha,\alpha'$-di-tetrahydrofuryl derivative, the Marker-Rohrmann formula is that of a spiro-ketal.

For the purpose of greater clarification, the Marker-Rohrmann formulation of the side chain of the steroidal sapogenins will be used in describing the invention. It is to be understood, however, that the processes and products of the present invention may be obtained by the use of the methods herein to be described and these processes and products are claimed without any implications that the reactions and structures involved will ultimately be proved to be as represented herein.

It is known that when steroidal sapogenins such as sarsasapogenin, chlorogenin, etc., are refluxed at atmospheric pressure with acetic anhydride, the nuclear hydroxyl groups are acetylated, and the simultaneous occurrence of any other transformation has never been described. Thus, there are obtained sarsasapogenin acetate, chlorogenin diacetate, etc., of the formulae,

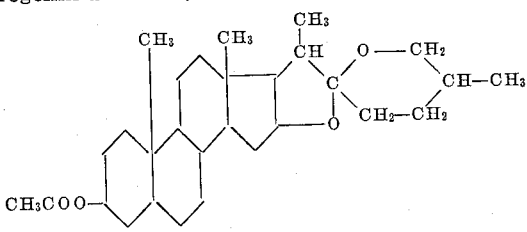

Sarsasopogenin acetate

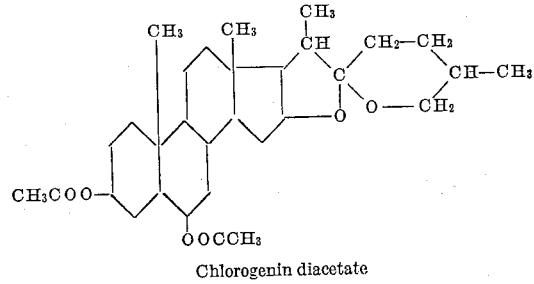

Chlorogenin diacetate

These acetylated steroidal sapogenins may be hydrolyzed, e. g. with acid or alkali, to regenerate the original sapogenins. Likewise, when p-nitrobenzoyl chloride and pyridine, succinic anhydride and pyridine, or other common acylating methods have been employed, the corresponding acylated sapogenins have been obtained, and it has been possible to hydrolyze these to the original sapogenins.

Now it has been found, however, that when the steroidal sapogenins are reacted with acidic agents, for example, with acylating agents such as acid anhydrides, under conditions more vigorous than those required merely for acylation, that new acylated steroidal sapogenin derivatives are formed which are not identical with acylated sapogenins obtained from the same reactants under milder conditions. The new compounds, on hydrolysis with alkali, do not regenerate the original steroidal sapogenins, but instead yield compounds isomeric with the sapogenins. I therefore designate the new free hydroxylic compounds as pseudo-sapogenins, (abbreviated, $\psi$-genins).

From the properties of my new $\psi$-sapogenins and their esters, it appears that they have, attached to ring D, a new, altered, side-chain of the probable formula $C_8H_{15}O(X)$, which may be of one of the following types,

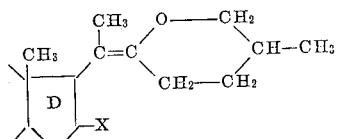

(A)

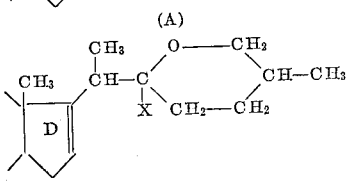

(B)

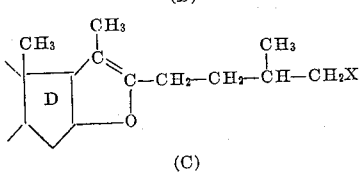

(C)

where X is hydroxyl in the case of the pseudo-sapogenins, and an acyloxy group in the case of the acylated pseudo-sapogenins.

The pseudo-sapogenins are characterized by the fact that they contain a new type of side chain which undergoes distinctive reactions. Thus the pseudo-sapogenins are unsaturated to bromine and therefore readily decolorize a solution of bromine in acetic acid. On treatment with acids, for example, with alcoholic hydrochloric acid, the pseudo-sapogenins are isomerized to the corresponding steroidal sapogenins. The side chain of the pseudo-sapongenins contains a reactive hydroxyl group which may be acylated, for example, acetylated.

The pseudo-sapogenins may also be characterized as steroidal sapogenin derivatives having attached to the steroidal ring D a side chain of formula $C_8H_{15}O$—X which may be represented structurally as,

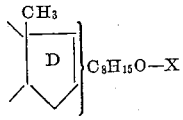

where X is a member of the class hydroxyl and groups capable of alkaline hydrolysis to give hydroxyl.

Now I have found that the pseudo-sapogenins can be reduced, for example, catalytically hydrogenated, to give a class of substances which contain two more hydrogen atoms in the side chain and which may therefore be designated as exo-dihydro-pseudo-sapogenins. The exo-dihydro-pseudo-sapogenins thus have attached to the steroidal ring D a side chain of formula $C_8H_{17}$—X which may be represented structurally as

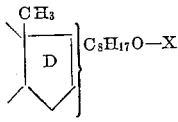

where X is a member of the class hydroxyl and groups capable of hydrolysis to give hydroxyl.

In contrast to the pseudo-sapogenins the exo-dihydro-pseudo-sapogenins are not affected by alcoholic hydrochloric acid. Like the pseudo-sapogenins, however, the exo-dihydro-pseudo-sapogenins show unsaturation to bromine in acetic acid and contain in the side chain a reactive hydroxyl group which may be acylated, for example acetylated. The structure in the side chain of these exo-dihydro-pseudo-sapogenins is not known with certainty. It is believed, however, that most of the reactions of these substances may be explained by one of the following structures for the side chain attached to ring D:

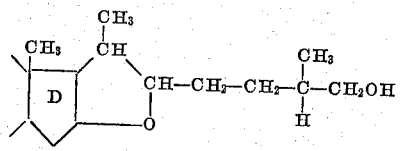

(A)

or

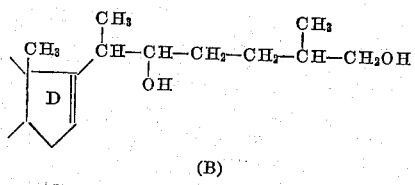

(B)

I have also found that one can oxidize the exo-dihydro-pseudo-sapogenins or their acylated derivatives so as to obtain etio-bilianic acids and $\Delta^{16}$-20-keto-pregnene compounds. The latter substances are not obtained when the sapogenins are oxidized. The products formed from the above oxidation of the exo-dihydro-pseudo-sapogenins or their esters are dependent on the nature of the material oxidized and on the reaction conditions. Thus, on mild oxidation, e. g. at room temperature with chromic anhydride in acetic acid, there is obtained mostly the $\Delta^{16}$-20-keto-pregnene compound together with a smaller amount of the etio-bilianic acid compound. The following formulae are illustrative:

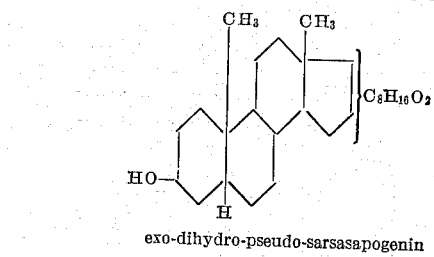

exo-dihydro-pseudo-sarsasapogenin

|oxidize mildly mainly ← → and some

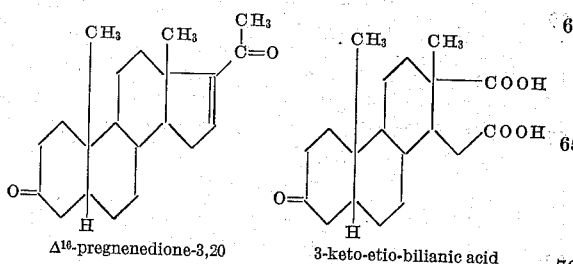

$\Delta^{16}$-pregnenedione-3,20     3-keto-etio-bilianic acid

Under more vigorous conditions the etio-bilianic acid compound is the major product, and rings A and B may suffer a more profound change so that in this case (e. g., at 70° C.) the following are the chief products from exo-dihy- dropseudo-sarsasapogenin and exo-dihydro-pseudo-tigogenin, respectively:

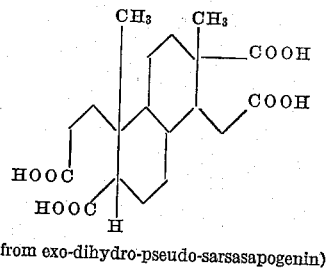

(from exo-dihydro-pseudo-sarsasapogenin)

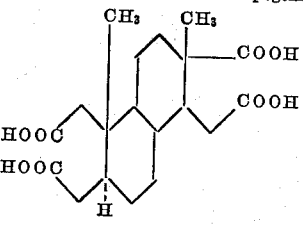

(from exo-dihydro-psuedo-tigogenin)

As the above examples show, when the exo-dihydro-pseudo-sapogenin compound oxidized contains hydroxyl groups in rings A and/or B these hydroxyl groups are attacked under the conditions of oxidation. When the oxidation conditions are mild, e. g., when using chromic anhydride in acetic acid at room temperature, the hydroxyl groups are in general converted into ketone groups. When the oxidation conditions are more vigorous, e. g., when the oxidation is conducted considerably above room temperature, rings containing hydroxyl groups are ruptured with formation of carboxylic acids.

When acylated exo-dihydro-pseudo-sapogenin compounds containing acyloxy groups in rings A and B are oxidized, rings A and B are not generally attacked. However, the reaction proceeds at the side chain in the same manner as for the unacylated exo-dihydro-pseudo-sapogenins, e. g.

*Mild oxidation*

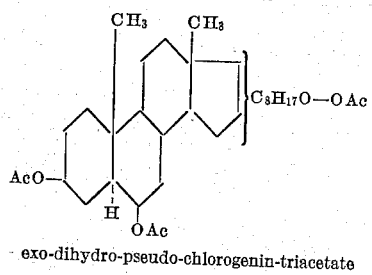

exo-dihydro-pseudo-chlorogenin-triacetate

|CrO₃—HOAc room temp; alkaline hydrolysis mainly ↙ ↘ and some

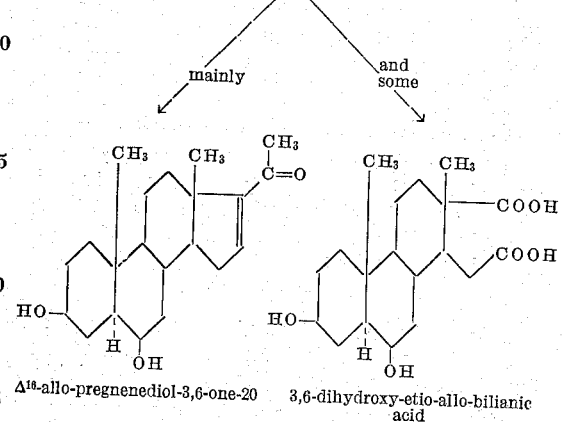

$\Delta^{16}$-allo-pregnenediol-3,6-one-20   3,6-dihydroxy-etio-allo-bilianic acid

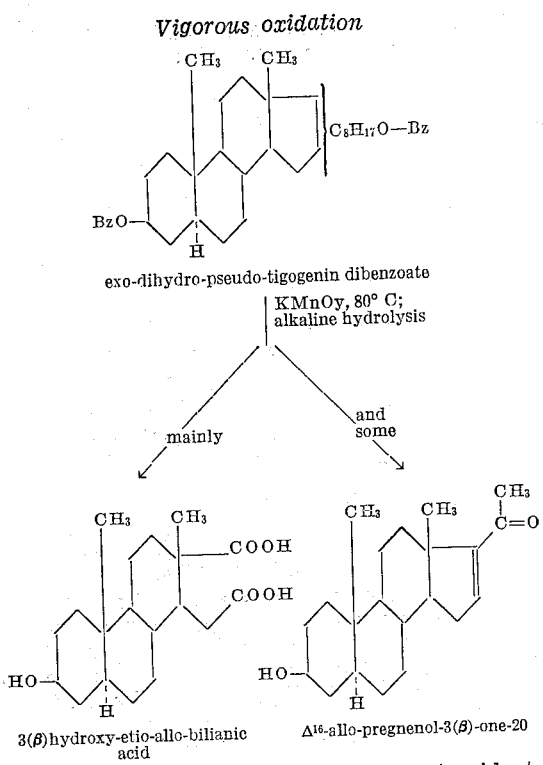

Oxidations of the side chains of steroids to produce 20-keto-pregnane and etio-bilianic acid derivatives have been described before, but all these processes have suffered from grave defects which make them impractical, wasteful or expensive for the manufacture of hormone intermediates.

Thus the use of the Wieland-Barbier degradation of bile acids (c. f. Fieser, "Chemistry of Natural Products Related to Phenanthrene," Reinhold Pub. Co., New York, N. Y., 2nd edition (1937), p. 146) requires the use of reactions difficult to apply in plant production, and numerous lengthy steps are required.

The oxidation of the side chain of sterols like cholesterol is extremely wasteful and gives only very poor yields of 20-keto-pregnane derivatives.

The oxidation of sterols unsaturated in the side chain, such as stigmasterol and ergosterol leads to only poor yields of the desired products, and, furthermore, the starting materials are quite expensive.

On the other hand, the present process gives relatively high yields of the desired substances, the starting materials are relatively inexpensive, being comparable in price to the bile acids, and the reactions are clean-cut and give rise to no large amounts of by-products. These advantages are obtained because this process is entirely new and the presence of the oxygen atoms in the side chain are used to facilitate the desired degradation.

It is especially surprising that the exo-dihydro-pseudo-sapogenin compounds should yield, on oxidation, $\Delta^{16}$-20-keto-pregnene derivatives, because double bonds are usually readily oxidized.

My invention may be further illustrated by the following examples:

EXAMPLE 1

(a) A mixture of 4 g. of sarsasapogenin acetate and 30 cc. of n-butyric anhydride is refluxed for eight hours. Then the excess anhydride is evaporated in vacuo. The syrup remaining behind is the 3-acetate exo-butyrate of pseudo-sarsasapogenin.

This syrup is boiled for a short time with sodium hydroxide solution and then the alkaline solution is diluted with water, extracted with ether and the ethereal extract concentrated on a steam bath. The white crystals which separate are collected, washed with ether, and recrystallized from ethyl acetate, giving needles of M. P. 170–173° C. This is pseudo-sarsasapogenin.

(b) A mixture of 1 g. of pseudo-sarsasapogenin, 500 mgs. of Adams' platinum oxide catalyst and 120 cc. of acetic acid is shaken with hydrogen at three atmospheres pressure and at room temperature for fifteen hours. The catalyst is removed by filtration and the filtrate evaporated in vacuo. The residual syrup is hydrolyzed with alcoholic potassium hydroxide and crystallized from acetone giving small white plates, M. P. 168–170° C. A mixture of this substance with pseudo-sarsasapogenin melts at 150–155° C. and a mixture with the dihydro-sarsasapogenin described by Marker and Rohrmann (Journal of the American Chemical Society, 61 846 (1939)) melts at 154–162° C. This new product is therefore not identical with the starting material nor with the dihydro-sarsasapogenin obtained by hydrogenating sarsasapogenin in acidic solution. Therefore, it is called exo-dihydro-pseudo-sarsasapogenin. The same product may be obtained by conducting the hydrogenation in absolute alcohol instead of in acetic acid.

Anal. calcd. for $C_{27}H_{46}O_3$: C, 77.4; H, 11.1. Found: C, 77.3; H, 10.9.

A sample of exo-dihydro-pseudo-sarsasapogenin is heated for a short time at 60° C. with p-nitrobenzoyl chloride and pyridine. The mixture is poured into dilute hydrochloric acid and the precipitate collected and recrystallized from ethyl acetate giving white needles, M. P. 196–197° C. This substance is the bis-p-nitrobenzoate of exo-dihydro-pseudo-sarsasapogenin.

Five grams of exo-dihydro-pseudo-sarsasapogenin are refluxed with 50 cc. of acetic anhydride for one-half hour. The excess acetic anhydride is removed in vacuo and the residual syrup crystallized from pentane to give white needles, M. P. 95° C., of exo-dihydro-pseudo-sarsasapogenin diacetate.

Instead of acetylating exo-dihydro-pseudo-sarsasapogenin to obtain exo-dihydro-pseudo-sarsasapogenin diacetate, the latter may also be prepared by hydrogenating pseudo-sarsasapogenin diacetate.

(c) To a solution of 4 g. of exo-dihydro-pseudo-sarsasapogenin in 200 cc. of acetic acid is added a solution of 6 g. of chromic anhydride in 50 cc. of 80% acetic acid. After standing at room temperature for ninety minutes, water is added and the mixture extracted with ether. The ethereal layer is washed with water and then thoroughly shaken with 3% sodium hydroxide solution. The ethereal extract is evaporated and the residue crystallized from acetone giving white plates, M. P. 199–201° C. This is $\Delta^{16}$-pregnenedione-3,20.

EXAMPLE 2

(a) A mixture of 8 g. of sarsasapogenin acetate and 30 cc. of acetic anhydride is heated in a bomb tube at 195–200° C. for ten hours. The acetic anhydride is then evaporated in vacuo and the residual syrup hydrolyzed by refluxing for thirty minutes with an excess of alcoholic potassium hydroxide. The alkaline solution is diluted with water and the precipitated solid taken up in ether. The ether is evaporated to a small volume and the white crystals collected, washed with ether, and recrystallized from ethyl acetate to give white needles, M. P. 171–173° C.

This product, which is pseudo-sarsasapogenin, forms a crystalline bis-p-nitrobenzoate which may be crystallized from acetone as pale yellow crystals, M. P. 156.5–159° C.

Pseudo-sarsasapogenin diacetate is prepared by refluxing 2.5 g. of pseudo-sarsasapogenin for thirty minutes with 15 cc. of acetic anhydride and then removing the acetic anhydride by evaporation in vacuo. The residual oil is pseudo-sarsasapogenin diacetate and it may be crystallized only with difficulty.

(b) To 1 g. of pseudo-sarsasapogenin diacetate in 100 cc. of acetic acid is added 0.2 g. of platinum oxide catalyst, and the suspension shaken for three hours in a hydrogen atmosphere. The mixture is filtered, the filtrate evaporated to dryness, and the residue crystallized from pentane to give white needles of exo-dihydro-pseudo-sarsasapogenin diacetate, M. P. 95° C., identical with that prepared as described in Example 1.

(c) Four grams of exo-dihydro-pseudo-sarsasapogenin diacetate is dissolved in 100 cc. of acetic acid and warmed to 90° C. A solution of 8 g. of chromic anhydride in 40 cc. of 80% acetic acid is run in with stirring in the course of an hour while the reaction temperature is maintained at about 90° C. After an additional hour of heating at 90° C., about 15 cc. of alcohol is added and the mixture is then concentrated in vacuo to a volume of 75 cc. Water is added and the precipitated solid taken up in ether. The ethereal extract is washed with water and 3% sodium hydroxide solution. The alkaline layer is heated on a steam bath for twenty minutes and then carefully acidified with hydrochloric acid. The precipitated acid is collected, dried and crystallized from chloroform to give white crystals of M. P. 220–223° C. This product is 3-($\beta$)-hydroxy-etio-bilianic acid.

EXAMPLE 3

(a) A mixture of 2.5 g. of chlorogenin and 30 cc. of acetic anhydride is heated at 200° C. for ten hours. The acetic anhydride is then evaporated in vacuo and the syrupy residue hydroylzed with hot alcoholic potassium hydroxide. The small white crystals which separate on dilution are collected and washed well with alcohol. The product thus obtained is pseudo-chlorogenin and after recrystallization from acetone has the M. P. 268–270° C. It gives a large depression in M. P. with a sample of chlorogenin. The substance is very sparingly soluble in acetone, ethyl acetate, ether, alcohol and similar solvents.

(b) A solution of 2. g. of pseudo-chlorogenin in 300 cc. of acetic acid is mixed with 0.5 of platinum oxide catalyst, and the suspension shaken in a hydrogen atmosphere at room temperature and 40 lbs. pressure for three hours. Then the mixture is filtered, and the filtrate evaporated to dryness. The residue is crystallized from alcohol and thus gives exo-dihydro-pseudo-chlorogenin, M. P. 270° C. This substance gives a depression in M. P. with pseudo-chlorogenin which also has M. P. 270° C.

(c) A mixture of 1 g. of exo-dihydro-pseudo-chlorogenin and 10 cc. of acetic anhydride is refluxed for a half hour. Then the excess acetic anhydride is removed in vacuo and the residue crystallized from methanol to give pure exo-dihydro-pseudo-chlorogenin triacetate, M. P. 150° C.

(d) Exo-dihydro-pseudo-chlorogenin triacetate is oxidized in a manner similar to that described in Example 1 (c). The reaction product is subjected to alkaline hydrolysis and gives $\Delta^{16}$-allo-pregnenone-20-diol-3,6.

EXAMPLE 4

(a) A mixture of 2 g. of epi-sarsasapogenin acetate and 20 cc. of acetic anhydride is heated at 200° C. for ten hours in a sealed tube. The acetic anhydride is evaporated in vacuo and the residue hydrolyzed with hot ethanolic potassium hydroxide. The neutral fraction is crystallized from acetone to give white needles of pseudo-epi-sarsasapogenin having M. P. 211–213° C.

(b) A mixture of 1.5 g. of pseudo-epi-sarsasapogenin, 1 g. of platinum oxide catalyst and 150 cc. of acetic acid is shaken with hydrogen at three atmospheres pressure at room temperature for seventeen hours. Then the catalyst is filtered off and the filtrate concentrated in vacuo. Since a certain amount of acetylation occurs during the above operations, this crude product is best hydrolyzed before attempting to crystallize it. For this purpose, the residue is refluxed for ten minutes with an excess of 3% ethanolic potassium hydroxide solution. Then the mixture is diluted with water and the precipitated product collected and crystallized from acetone to give white needles, M. P. 135–137° C., of exo-dihydro-pseudo-epi-sarsasapogenin.

One hundred mgs. of exo-dihydro-pseudo-epi-sarsasapogenin is warmed for an hour at 60° C. with 200 mgs. of p-nitrobenzoyl chloride and 3 cc. of pyridine. Then the mixture is poured into dilute hydrochloric acid and the precipitate collected. After crystallization from acetone, there is obtained the characteristic exo-dihydro-pseudo-epi-sarsasapogenin di-p-nitrobenzoate as white needles of M. P. 207–209° C.

(c) A solution of 4.16 g. of exo-dihydro-pseudo-epi-sarsasapogenin in 20 cc. of acetic anhydride is refluxed for thirty minutes. Then the excess acetic anhydride is removed by distillation in vacuo. The residual exo-dihydro-pseudo-epi-sarsasapogenin diacetate may be purified by recrystallization. However, it is sufficiently pure for the next step.

(d) The above residue of exo-dihydro-pseudo-epi-sarsasapogenin diecetate is dissolved in 100 cc. of acetic acid and cooled to 15° C. Then the mixture is vigorously stirred while a solution of 3.5 g. of chromic anhydride in 30 cc. of 85% acetic acid is added at such a rate that the temperaure does not rise above 25°. Then the mixture is allowed to stand at 28° C. for ninety minutes. At the end of this time, water is added and the mixture is thoroughly extracted with ether. The ethereal extract is washed well with water and with a 3% solution of sodium hydroxide. The ethereal extract is evaporated to a syrup and the latter hydrolyzed by refluxing for thirty minutes with a solution of 2 g. of potassium hydroxide in 200 cc. of ethyl alcohol. The hydrolysate is diluted with water and extracted with ether. After washing the ethereal extract well with water, it is evaporated on the steam bath and the residue crystallized from ether. This product is $\Delta^{16}$-pregnenol-3-($\alpha$)-one-20 and has M. P. 194–196° C.

One hundred mgs. of the above Δ¹⁶-pregnenol-3-(α)-one-20 is refluxed with 2 cc. of acetic anhydride for twenty minutes. Then the excess acetic anhydride is removed by distillation and the residue crystallized from dilute methanol and dilute acetone to give Δ¹⁶-pregnenol-3-(α)-one-20 acetate as needles of M. P. 96–99° C.

EXAMPLE 5

(a) A mixture of 3.6 g. of tigogenin and 25 cc. of acetic anhydride is heated at 195–200° C. for eight hours. The solvent is removed in vacuo and the residue hydrolyzed with ethanolic potassium hydroxide. The neutral material is crystallized from aqueous acetone to give white crystals of pseudo-tigogenin having M. P. 193–196° C.

(b) To a solution of 500 mgs. of pseudo-tigogenin in 50 cc. of glacial acetic acid is added 250 mgs. of platinum oxide catalyst. The mixture is shaken with hydrogen at 45 lbs. pressure for twenty hours. Then the catalyst is removed by filtration and the filtrate concentrated to a small volume. On cooling, a crystal crop separates. This crop is collected and recrystallized from acetic acid and from ether to give exo-dihydro-pseudo-tigogenin of M. P. 202–205° C. It is very insoluble in acetone and ether.

The same exo-dihydro-pseudo-tigogenin is obtained by hydrogenating pseudo-diosgenin or pseudo-tigogenone according to the procedure outlined in the above paragraph.

In contrast to pseudo-tigogenin, exo-dihydro-pseudo-tigogenin is recovered unchanged after refluxing for two hours with alcoholic hydrochloric acid. Both pseudo-tigogenin and exo-dihydro-pseudo-tigogenin readily decolorize bromine in acetic acid.

(c) To a solution of 500 mgs. of exo-dihydro-pseudo-tigogenin in 25 cc. of acetic acid there is added a solution of 250 mgs. of chromic anhydride in 5 cc. of 95% acetic acid. After the mixture has stood at room temperature for ninety minutes, water is added and the mixture extracted with ether. The ethereal layer is washed well with sodium carbonate solution and then the ether is removed on the steam bath. The residue is crystallized from ether-pentane to give Δ¹⁶-allo-pregnenedione-3,20, M. P. 208–211° C.

EXAMPLE 6

(a) A mixture of 9 g. of desoxysarsasapogenin and 40 cc. of acetic anhydride is heated in a sealed tube for ten hours at 200° C. Then the acetic anhydride is evaporated in vacuo and the residue hydrolyzed by refluxing it with an excess of alcoholic potassium hydroxide for thirty minutes. The mixture is diluted with water and the product extracted with ether. After removing the ether on a steam bath the residue is crystallized from aqueous acetone to give pseudo-desoxysarsasapogenin of M. P. 130° C.

(b) A mixture of 600 mgs. of pseudo-desoxysarsasapogenin, 200 mgs. of platinum oxide catalyst and 80 cc. of glacial acetic acid is shaken with hydrogen at room temperature and a pressure of three atmospheres for sixteen hours. Then the mixture is filtered and the solvent evaporated in vacuo. The residue is hydrolyzed by refluxing it for a short time with methanolic potassium hydroxide solution. The hydrolyzed mixture is diluted with water, extracted with ether and the ethereal extract washed well with water. The ether is removed on the steam bath and the residue is crystallized from acetone to give exo-dihydro-pseudo-desoxysarsasapogenin of M. P. 128–129° C. A mixture with pseudo-desoxysarsasapogenin melts at 105–112° C. proving their non-identity.

EXAMPLE 7

(a) Tigogenone is prepared by the oxidation of tigogenin with chromic anhydride in acetic acid at room temperature according to the method of Jacobs and Fleck, J. Biol. Chem. 88, 548 (1930).

(b) epi-Tigogenin is prepared from this as follows: A mixture of 20 g. of tigogenone, 20 g. of aluminum isopropylate and 500 cc. of dry isopropyl alcohol is refluxed on a steam bath for eight hours. Then the mixture is slowly distilled through a short column over a period of four hours to a small volume. To this residue is added 20 g. of potassium hydroxide in 500 cc. of methanol and the whole is refluxed for fifteen minutes. Then the mixture is poured into water and acidified with hydrochloric acid. The precipitated solid is removed by extraction with ether and the ethereal extract thus obtained is washed well with water. The ethereal extract is evaporated to dryness on the steam bath and the residue dissolved in 1 liter of 95% alcohol. To this is added a boiling solution of 40 g. of digitonin in 3 liters of 95% alcohol. After standing for three hours at room temperature, the precipitated digitonide is collected and washed with alcohol. The alcoholic filtrate is concentrated to a volume of 500 cc. and 4 liters of ether are added. A small precipitate is filtered off and the ethereal filtrate washed well with water. Then the ethereal solution is evaporated to dryness on a steam bath and the residue crystallized from acetone, methanol, and ethyl acetate to give epi-tigogenin of M. P. 242–245° C.

A solution of 100 mgs. of the above epi-tigogenin is refluxed with 5 cc. of acetic anhydride for thirty minutes. On cooling, the acetate of epi-tigogenin separates in the form of needles. These are collected, recrystallized from methanol-acetone and then have M. P. 199–202° C.

(c) A mixture of 10 g. of epi-tigogenin and 25 cc. of acetic anhydride is heated in a sealed tube for ten hours at 200° C. Then the tube is opened and the excess acetic anhydride removed by distillation in vacuo. The residue is crude pseudo-epi-trigogenin diacetate and it may be purified by crystallization from ether-pentane.

The whole of the pseudo-epi-tigogenin diacetate obtained as described above is hydrolyzed by refluxing it for thirty minutes with an excess of alcoholic potassium hydroxide solution. The hydrolysate is diluted with water and the product isolated by extraction with ether and then evaporating the ethereal extract. The residue is crystallized from ether-pentane, and dilute acetone to give needles of pseudo-epi-tigogenin of M. P. 148–150° C.

(d) A mixture of 1 g. of pseudo-epi-tigogenin, 500 mgs. of Adam's platinum oxide catalyst and 100 cc. of glacial acetic acid is shaken with hydrogen at three atmospheres pressure at room temperature for twelve hours. Then the catalyst is filtered off and the filtrate evaporated in vacuo. The residue is crystallized from ether, acetone and finally methanol. As thus obtained the product, exo - dihydro - pseudo - epi - tigogenin, forms longs needles of M. P. 193–196° C.

One gram of exo-dihydro-pseudo-epi-tigogenin is refluxed with 10 cc. of acetic anhydride for thirty minutes. The excess acetic anhydride is removed by distillation in vacuo and the residue is crystallized from methanol to give exo-dihydro-pseudo-epi-tigogenin diacetate, M. P. 118–121° C.

The same exo-dihydro-pseudo-epi-tigogenin diacetate may be obtained by hydrogenating pseudo-epi-tigogenin diacetate.

(e) To a solution of 1 g. of exo-dihydro-pseudo-epi-tigogenin diacetate in 30 cc. of glacial acetic acid at 25–28° C. is added a solution of 1.2 g. of chromic anhydride in 20 cc. of 90% acetic acid. The oxidation mixture is allowed to stand for ninety minutes at room temperature, and then water is added and the mixture extracted with ether. The ethereal extract is washed thoroughly with sodium hydroxide solution and with water and then the ether is evaporated and the residue crystallized from dilute methanol. Thus there is obtained $\Delta^{16}$-allo-pregnenol-3($\alpha$)one-20 acetate of M. P. 157–159° C.

Example 8

(a) Exo-dihydro-pseudo-epi-tigogenin is prepared for instance as described in Example 7.

(b) The above exo-dihydro-pseudo-epi-tigogenin may be oxidized with chromic anhydride in acetic acid at room temperature according to the method of Example 5(c). Thus there is obtained $\Delta^{16}$-allo-pregnenedione-3,20 of M. P. 208–211° C.

Example 9

(a) A mixture of 5 g. of diosgenin and 25 cc. of acetic anhydride is heated in a bomb tube at 195–200° C. for six to fifteen hours. Then the acetic anhydride is evaporated in vacuo to leave a residue which crystallizes after cooling. This residue may be recrystallized from methanol and then has a melting point of 97–101 C. It is pseudo-diosgenin diacetate.

(b) A solution of 5 g. of pseudo-diosgenin diacetate in 500 cc. of acetic acid is shaken with 500 mgs. of platinum oxide catalyst under hydrogen at a pressure of three atmospheres for six hours. Then the catalyst is removed by filtration and the filtrate evaporated in vacuo. The residue is crystallized from methanol, thereby yielding exo-dihydro-pseudo-tigogenin diacetate of M. P. 122–124° C.

Exo-dihydro-pseudo-tigogenin diacetate may also be prepared by hydrogenating pseudo-tigogenin diacetate or pseudo-tigogenone acetate or by acylating exo-dihydro-pseudo-tigogenin.

(c) To a solution of 20 g. of exo-dihydro-pseudo-tigogenin diacetate in 500 cc. of glacial acetic acid cooled to 15° C. is added a solution of 15 g. of chromic anhydride in 20 cc. of water and 30 cc. of acetic acid. The temperature is allowed to rise to 30° C. and maintained at that point for two hours with constant stirring. Then water is added and the mixture extracted well with ether. The ethereal extract is washed with water and with 3% sodium hydroxide solution and then again with water. The ethereal extract is evaporated on a steam bath and the residue hydrolyzed by refluxing it with a 1% of alcoholic potassium hydroxide solution for thirty minutes. The hydrolysate is diluted with water and extracted with ether. The ethereal extract is washed with water and then the ether is removed on a steam bath. The residue is crystallized from dilute methanol and from ether to give $\Delta^{16}$-allo-pregnenol-3($\beta$)-one-20 of M. P. 202–204° C.

A sample of the above $\Delta^{16}$-allo-pregnenol-3($\beta$)-one-20 is refluxed for fifteen minutes with an excess of acetic anhydride. Then the acetic anhydride is removed by distillation under reduced pressure and the residue is crystallized from methanol. Thus there is obtained $\Delta^{16}$-allo-pregnenol-3($\beta$)-one-20 acetate of M. P. 162–164° C.

The foregoing examples, illustrative of my invention, are subject to numerous variations in regard to the reactants employed, the conditions of reaction, the modes of removing the products from reaction mixtures, and the like. All of these variations, herein described and claimed, fall within the scope of my invention.

The reduction of the pseudo-sapogenin compound is conveniently accomplished by shaking the pseudo-sapogenin, or an ester thereof, with platinum oxide catalyst in acetic acid in the presence of a slight pressure of hydrogen at about room temperature. The platinum oxide catalyst is prepared according to the directions of "Organic Syntheses," VIII, 92, ed. by R. Adams (Wiley, N. Y. C., 1928). In reality, the actual catalyst is platinum metal in a particularly active form, since the platinum oxide is reduced to this under the conditions of hydrogenation.

Instead of using platinum oxide as a catalyst, other catalysts such as platinum black, Raney nickel or the various base metal oxide catalysts such as copper chromite may be used with satisfactory results. Instead of using acetic acid as a solvent in the reduction, other organic solvents inert to catalytic hydrogenation such as alcohol or ethyl acetate may be used with as satisfactory results.

In general, any pseudo-sapogenin or an exo-acylate thereof can be reduced in the side chain according to my invention to form an exo-dihydro-pseudo-sapogenin or exo-acylate thereof; since I have found that this reduction is a characteristic reaction of the pseudo-sapogenin side chain, and proceeds independently of structural features in other portions of the molecule, as for example in rings A and B. When pseudo-sapogenins, or exo-acylates thereof, containing reducible groups either in rings A and/or B, or in substituents attached thereto, are reduced to form exo-dihydro-pseudo-sapogenin compounds the said reducible groups are transformed during the process. The most frequently encountered reducible groups may be tabulated together with their transformation products as follows:

| Reducible group: | Group formed on reduction: |
|---|---|
| Ketone group | Secondary alcohol |
| Aldehyde group | Primary alcohol |
| Double bond | Saturated compound |
| Triple bond | Saturated compound |
| —C≡N | —CH$_2$NH$_2$ |
| —NO$_2$ | —NH$_2$ |

Examples of transformations of this sort have already been given. For instance, pseudo-diosgenin, pseudo-tigogenone and $\Delta^4$-pseudo-tigogenenone yield, on reduction the same product that pseudo-tigogenin yields, namely, exo-dihydro-pseudo-tigogenin.

When the nucleus of the pseudo-sapogenin compound to be reduced contains only substituents unaffected by catalytic hydrogenation, such as —OH, —Cl, —Br, —NH$_2$, —O—acyl, —COOH, —COO—alkyl and —CONH$_2$, then the exo-dihydro-pseudo-sapogenin compound formed will contain the same groupings.

It will be appreciated that my invention comprehends these new pseudo-sapogenin reduction products which I have designated as exo-dihydropseudo-sapogenin compounds. These new substances are characterized by containing in the steroid skeleton only such groupings as are unaffected by catalytic hydrogenation under conditions which reduce pseudo-sapogenins to exo-dihydro-pseudo-sapogenins, and they are further characterised by having in the side chain attached to ring D the structure,

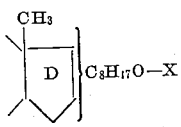

where X is a member of the class consisting of —OH and groups hydrolyzable to —OH.

A particularly useful class of exo-dihydro-pseudo-sapogenin compounds may be represented by the formula,

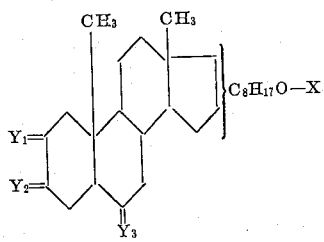

where $Y_1$, $Y_2$ and $Y_3$ are members of the class consisting of

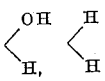

and groups hydrolyzable to

and where X is a member of the class consisting of —OH and groups hydrolyzable to —OH. These compounds are especially easily obtained since the sapogenins from which they are derived are themselves readily available. Some of these parent sapogenins occur in nature in the form of saponins while the rest of these parent sapogenins are readily prepared from the saponins by simple transformations.

The exo-dihydro-pseudo-sapogenins contain a reactive hydroxyl group in the side chain. I have found that it is possible to acylate this hydroxyl group by treating the exo-dihydro-pseudo-sapogenin with an acylating agent as illustrated in the above examples. Suitable acylating agents other than those indicated in the examples include benzoyl chloride, furoyl chloride, butyric anhydride, ketone or, in general, other acid anhydrides, acid halides and the like.

The exo-dihydro-pseudo-sapogenin compounds acylated at the exo-hydroxyl group can be hydrolyzed by treatment with hydrolytic agents such as alkaline or acidic reagents. Such hydrolytic agents include aqueous sodium hydroxide, alcoholic hydrochloric acid and the like.

The oxidation of the exo-dihydro-pseudo-sapogenin compound may be accomplished on either the free exo-dihydro-pseudo-sapogenin or an exo-dihydro-pseudo-sapogenin exi-acylate.

Oxidizing agents and conditions other than those illustrated in the examples may be used. However, potassium permanganate in acetic acid, chromic anhydride in acetic acid, and potassium dichromate and sulfuric acid in aqueous acetone have proved to be especially useful agents for this transformation. As has already been indicated, if free hydroxyl groups are present in the nucleus in rings A and B of the exo-dihydro-pseudo-sapogenin compound, these groups are converted into ketone groups or, under more vigorous oxidizing conditions, they may be more extensively oxidized with ring rupture to form carboxylic acids. Therefore, if it is desired to retain nuclear hydroxyl groups in the product, it is necessary to temporarily protect the nuclear hydroxyl groups by acylation during oxidation of the exo-dihydro-pseudo-sapogenin compound. Examples of transformation of these various types have already been shown.

As the examples show, the relative amount of the etio-bilianic acid compound, and the corresponding $\Delta^{16}$-20-keto-pregnene compound formed in a particular instance is determined by the reaction conditions and may be controlled to yield a preponderance of either product. Generally, the $\Delta^{16}$-20-keto-pregnene compound is the major product at room temperatures, and conversely, the major product at temperatures in the neighborhood of 50–100° C. is the etio-bilianic acid compound.

By pregnene or etio-bilianic acid compounds as herein described, I mean the compounds in the generic rather than the specific sense. While, for example, the term "pregnene" derivatives is often used to mean those compounds having a configuration at $C_5$ like coprostane and sarsasapogenin, as distinguishes from "allo-pregnene," which has a configuration at $C_5$ like cholestane and tigogenin, for convenience I use herein the term "pregnene" and "pregnene compounds" to mean both "pregnene" and "allo-pregnene" derivatives.

While the separation of the etio-bilianic acid compound and the $\Delta^{16}$-20-keto-pregnene compound, resulting from oxidation of my new compounds, is readily accomplished by extracting the former from a solution of the mixture in a water-immiscible solvent with aqueous alkali solutions, other means may also be used. For example, the products may be separated by fractional sublimation in a high vacuum, fractional crystallization, chromatographic adsorption, and so on.

What I claim as my invention is:

1. The process for the preparation of steroid intermediate compounds which comprises reducing a pseudo-sapogenin compound, thereby producing an exo-dihydro-pseudo-sapogenin compound, and oxidizing the latter to a member of the class consisting of etio-bilianic acid compounds and $\Delta^{16}$-20-keto-pregnene compounds.

2. The process for the preparation of steroid intermediate compounds which comprises catalytically hydrogenating a pseudo-sapogenin, thereby producing an exo-dihydro-pseudo-sapogenin, and oxidizing the latter under relatively mild conditions, thereby producing a $\Delta^{16}$-20-keto-pregnene compound.

3. The process for the preparation of steroid intermediate compounds which comprises catalytically hydrogenating a pseudo-sapogenin exo-acylate, thereby producing an exo-dihydro-pseudo-sapogenin exo-acylate, oxidizing the latter under relatively mild conditions and hydrolyzing the oxidation product, thereby producing a $\Delta^{16}$-20-keto-pregnene compound.

4. The process which comprises oxidizing an exo-dihydro-pseudo-sapogenin compound, thereby producing a member of the class consisting of etio-bilianic acid compounds and $\Delta^{16}$-20-keto-pregnene compounds.

5. The process which comprises oxidizing an exo-dihydro-pseudo-sapogenin under relatively mild conditions, thereby producing a $\Delta^{16}$-20-keto-pregnene compound.

6. The process which comprises oxidizing an exo-dihydro-pseudo-sapogenin exo-acylate under relatively mild conditions and hydrolyzing the oxidation product, thereby producing a $\Delta^{16}$-20-keto-pregnene compound.

7. The process which comprises catalytically hydrogenating pseudo-sarsasapogenin in the presence of a platinum catalyst thereby producing exo-dihydro-pseudo-sarsasapogenin, and oxidizing the latter with chromic acid below 50° C. thereby forming $\Delta^{16}$-pregnenedione-3,20.

8. The process which comprises catalytically hydrogenating a diacylate of pseudo-sarsasapogenin in the presence of a platinum catalyst, oxidizing the diacylate of exo-dihydro-pseudo-sarsasapogenin thus formed with chromic acid below 50° C. and hydrolyzing the reaction product thereby forming $\Delta^{16}$-pregnenol-3($\beta$)-one-20.

9. The process which comprises oxidizing exo-dihydro-pseudo-sarsasapogenin with chromic acid below 50° C. thereby producing $\Delta^{16}$-pregnenedione-3,20.

10. The process which comprises oxidizing a diacylate of exo-dihydro-pseudo-sarsasapogenin with chromic acid below 50° C. and hydrolyzing the reaction product thereby forming $\Delta^{16}$-pregnenol-3($\beta$)-one-20.

11. Process according to claim 9 wherein the oxidation is conducted in acetic acid at 20-35° C.

12. Process according to claim 10 wherein the oxidation is conducted in acetic acid at 20-35° C.

RUSSELL EARL MARKER.